Aug. 12, 1924.  
1,504,951  
C. G. HALL  
DIFFERENTIAL TRANSMISSION  
Filed May 11, 1921 6 Sheets-Sheet 1
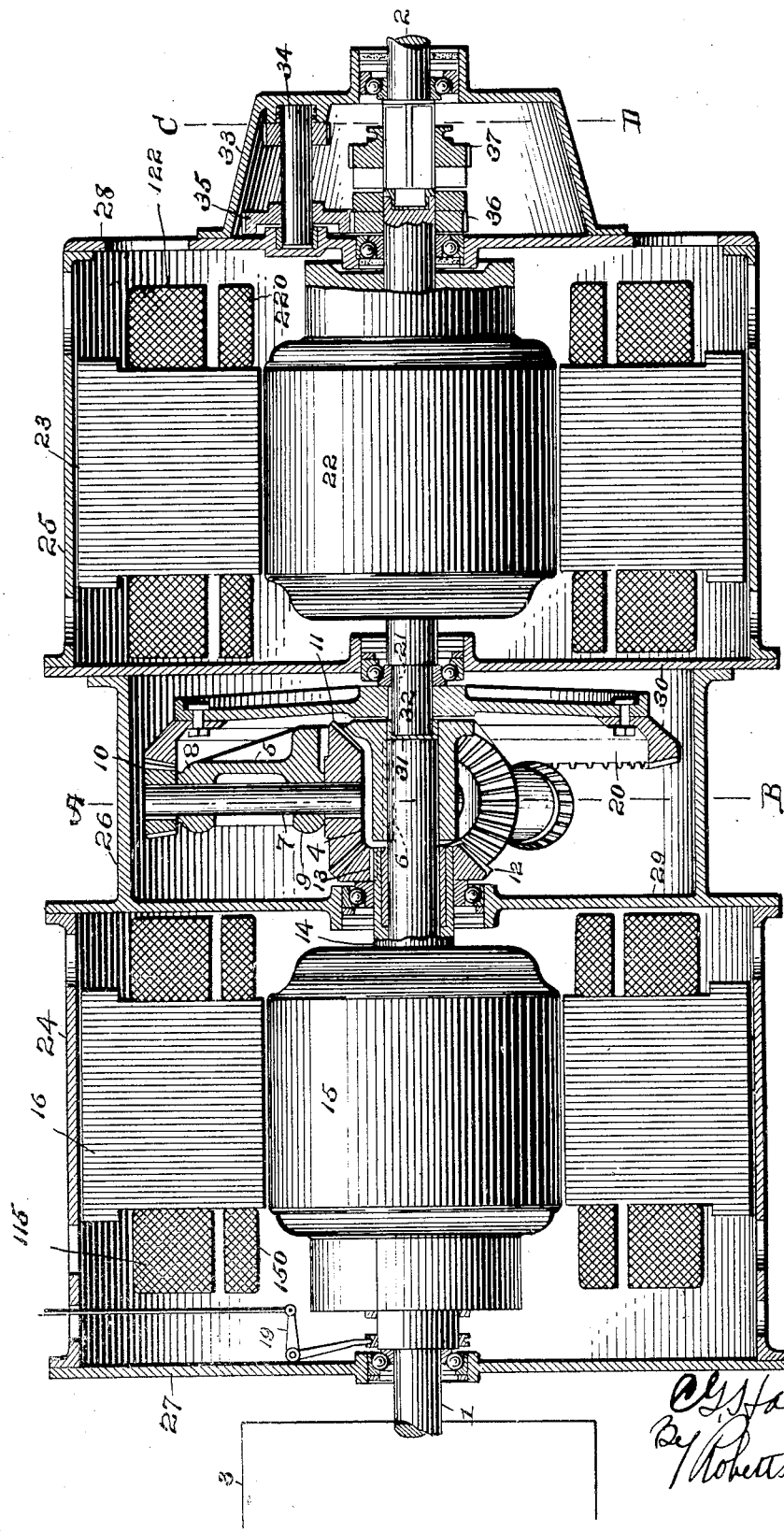

Aug. 12, 1924.
C. G. HALL
1,504,951
DIFFERENTIAL TRANSMISSION
Filed May 11, 1921   6 Sheets-Sheet 2
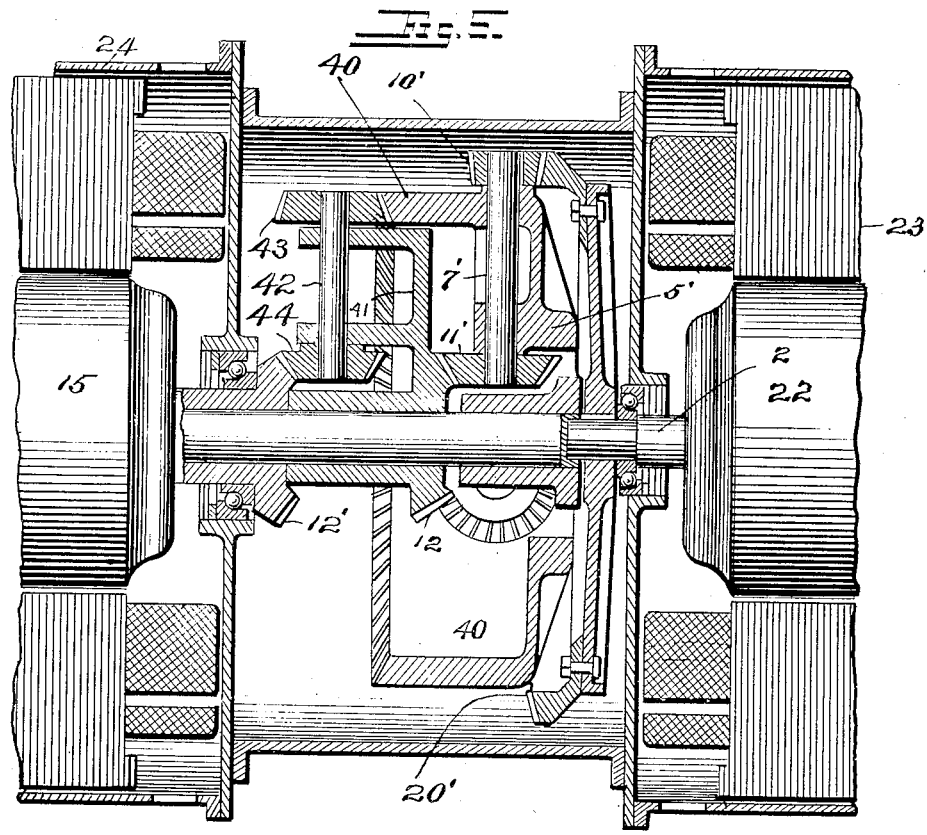
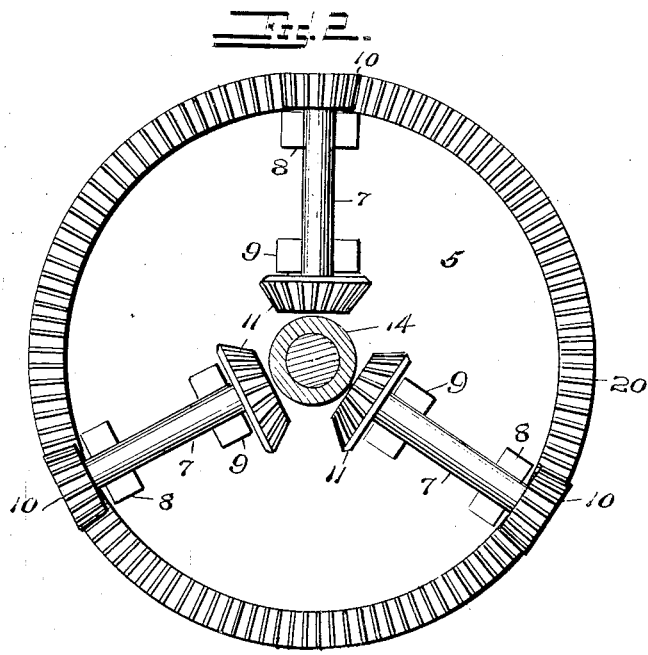
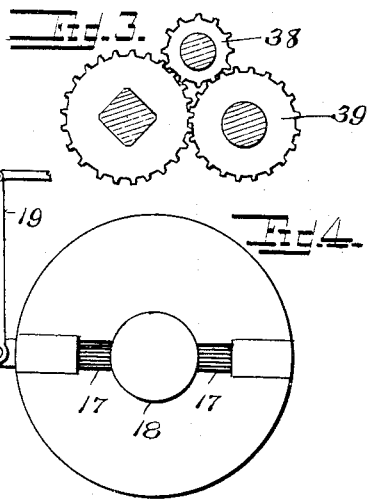

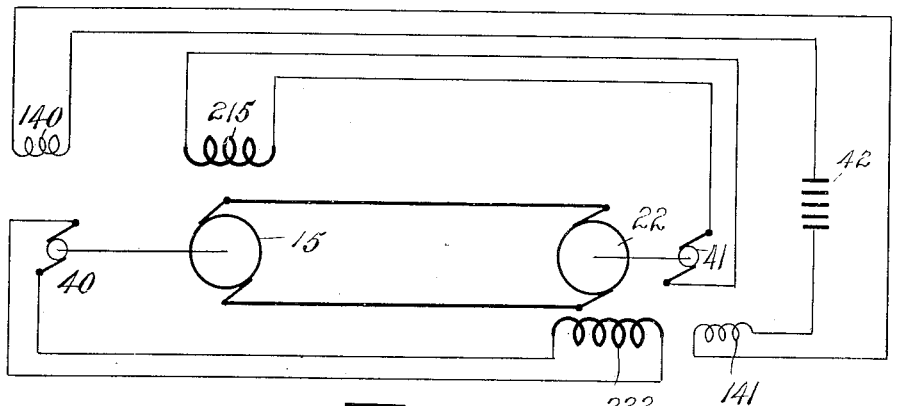
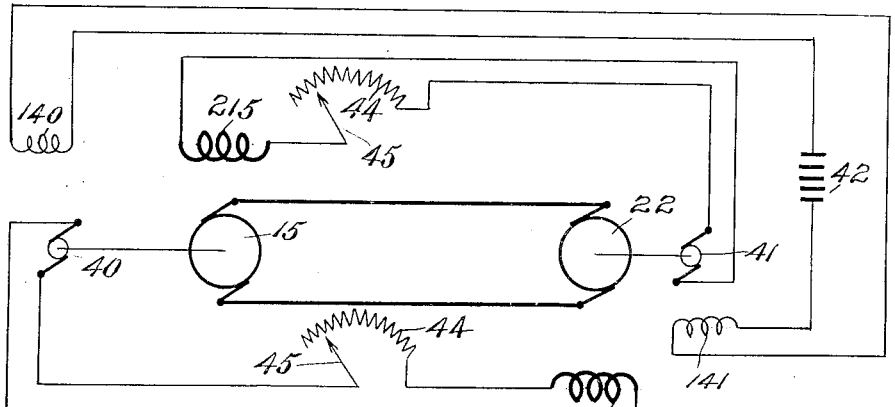
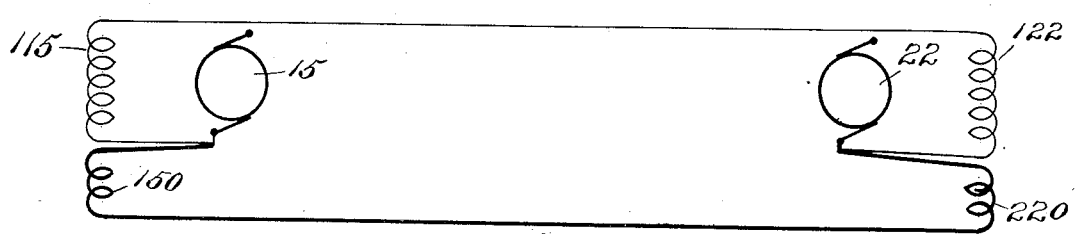
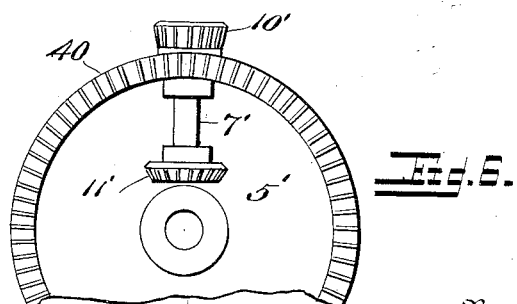

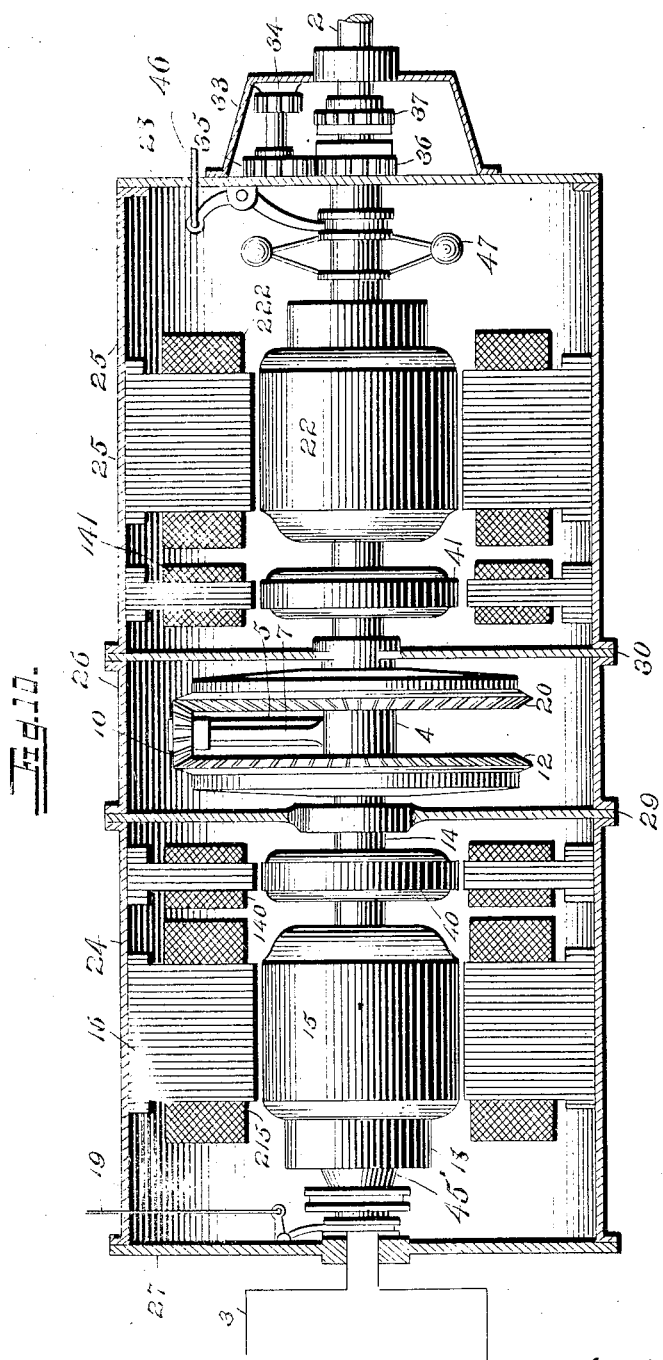

Aug. 12, 1924.
C. G. HALL
1,504,951
DIFFERENTIAL TRANSMISSION
Filed May 11, 1921     6 Sheets-Sheet 5
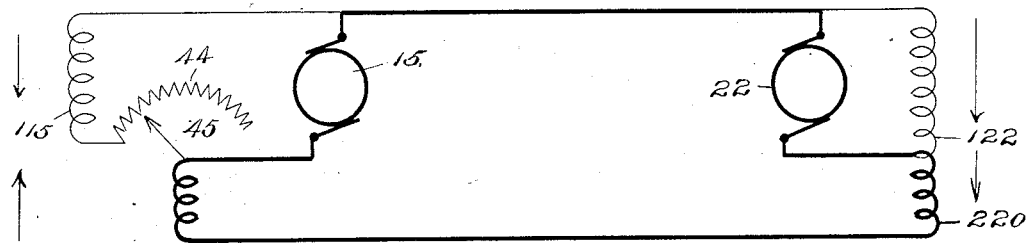
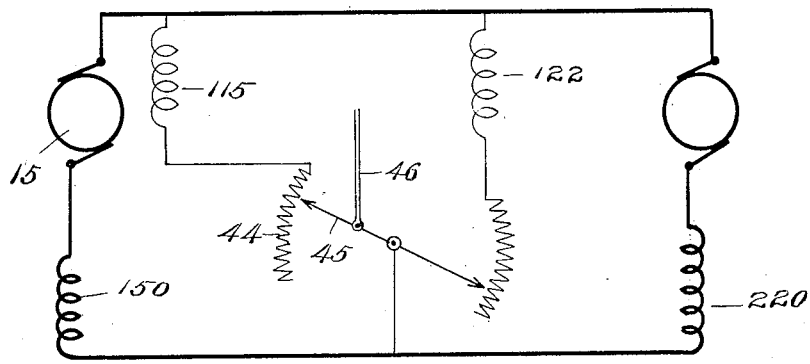
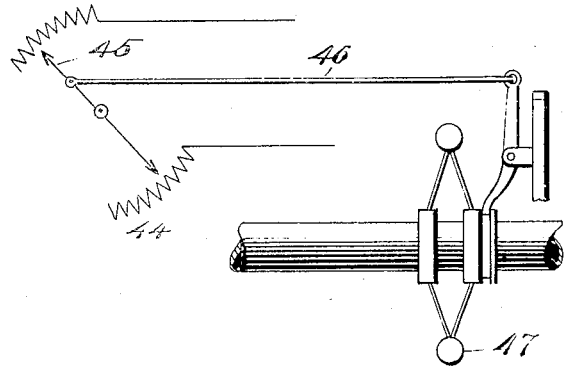
Inventor
C. G. Hall
By Robert H. Young
Attorney

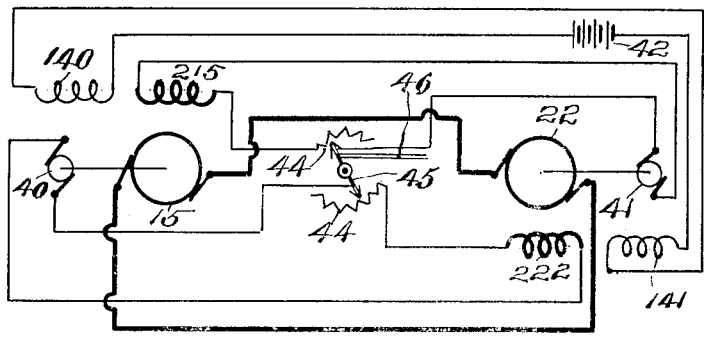
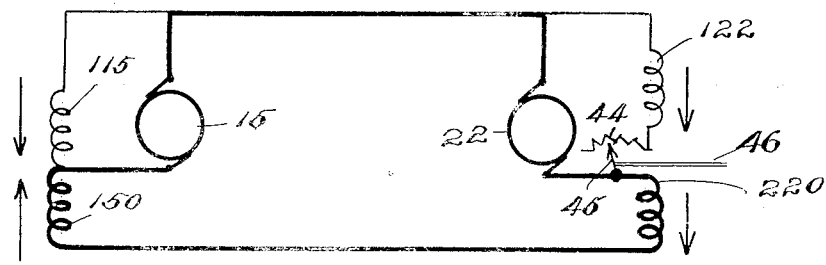
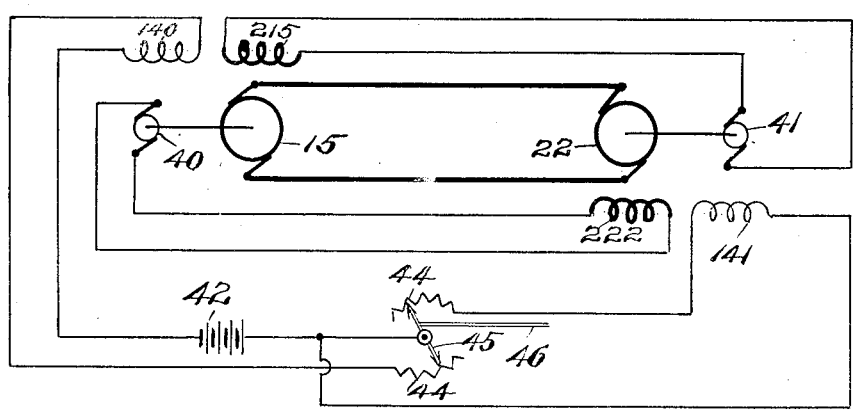

Patented Aug. 12, 1924.

1,504,951

UNITED STATES PATENT OFFICE.

CHALMERS G. HALL, OF WASHINGTON, DISTRICT OF COLUMBIA.

DIFFERENTIAL TRANSMISSION.

Application filed May 11, 1921. Serial No. 468,673.

*To all whom it may concern:*

Be it known that I, CHALMERS G. HALL, a citizen of the United States, residing at Washington, in the District of Columbia, have invented certain new and useful Improvements in Differential Transmissions, of which the following is a specification.

This invention relates to differential transmissions and more especially to such in which electrical units are employed as action and reaction elements.

The present invention deals more particularly with a new type of differential gearing which enables one to effect considerable economies in weight and space over those used heretofore. Moreover, by virtue of the electrical circuits employed and disclosed herewith an automatic system of control has been made possible which when considered in conjunction with the above economy of mechanical structure, lends itself most admirably to aircraft work. A distinguishing feature of the proposed electrical circuits is that they are automatic in character and require no attention at the hands of the operator.

As a feature of such differential drive, by a system of gearing giving leverlike advantages, the required torque of reaction is reduced to a degree very much below that required for the driving action.

In particular, in conjunction with such drive, by arranging a plurality of excitation circuits for both the generator and motor side of the above unbalanced differential, it has become possible to arrange an electrical system which automatically regulates the voltages of the separate units in the required manner, leaving the common current flowing through the armature of the motor and generator action and reaction units to adjust itself in order to obtain the required torque conditions for electrical stability. This object has been attained with a minimum degree of complexity and substantially without the use of energy absorbing resistances. Other advantages and features of the invention will be more particularly pointed out in the accompanying claims.

In the accompaning drawings:

Figure 1 is a vertical diametrical section through the transmission device;

Figure 2 is a cross section through the same on the line A—B of Figure 1;

Figure 3 is a cross section through the reversing gear on line C—D of Figure 1;

Figure 4 is a fragmentary end elevation showing the means for advancing and retracting the commutator brushes of the generator;

Figure 5 shows a torque reduction adaptation;

Figure 6 is a fragmentary showing of one of the disc gears illustrated in Figure 5;

Figure 7 is a self-regulating exciter wiring diagram adaptable to Figure 10;

Figure 8 is a modification of Figure 7 permitting a superposed manual control;

Figure 9 is a simplified form of diagram functioning substantially as Figure 7 above;

Figure 10 is an electrical modification of Figure 1; however, a one to one transmission has been introduced to emphasize the possibility of the exciter arrangement.

Figure 11 is a modification of Figure 9 adapted for superposed manual control.

Figure 12 is a further modification of the simplified diagram of Figure 9 adapted for automatic load control.

Figure 13 illustrates one embodiment of such automatic load controlled device.

Figure 14 diagrammatically illustrates a load controlling arrangement for the separate exciter type of wiring.

Figure 15 illustrates an alternative method to Figures 11 and 12.

Figure 16 illustrates a modification of Figure 14 with the field control operated through load control of the exciter field windings.

Referring in particular to the drawings, Figures 1 to 4, 1 designates what will hereinafter be termed the driving shaft of the transmission gear, while 2 represents the driven shaft to which the power is transmitted from the shaft 1 by differential gearing hereinafter fully described. The shaft 1 constitutes the output or delivery shaft of a prime mover, a fragment of which is indicated at 3. Said prime mover may be of any kind; it may for example consist of a motor of any suitable type, such as an electric motor, an internal combustion engine, steam engine or the like.

The driving shaft 1 has fast thereon the hub 4 of a spider 5 of differential gearing, said spider being shown as fastened to the shaft 1 by means of a key 6. The spider 5 comprises one or more arms, three arms being illustrated in the drawings. It will be apparent, however, that any number of arms may be provided on the spider in accordance with the will of the manufacturer. Each arm of the spider has journaled therein a rotary shaft 7, the spider being provided in one embodiment with bearings 8 and 9. Fast on one end of each shaft 7 is a gear 10 of suitable type, and fast on the opposite end of said shaft is another gear 11. The gear 11 meshes with and drives another gear 12 which is fastened by a key 13 to a tubular shaft 14 which encircles and bears upon the driving shaft 1, but turns independently thereof. The shaft 14 carries the armature shaft of a generator shown as embodying the conventional armature 15 which revolves within the field frame 16. The generator is preferably of the interpole, direct current type, embodying brushes 17 which may be rotated around the axis of the generator in contact with the commutator 18 through an arc equal to the number of degrees between two consecutive poles. A brush adjusting connection 19 is provided for moving the brushes in the manner stated. With such an interlocked coupling, when the throttle of the prime mover is adjusted to give greater or less speed, the brushes 17 are correspondingly adjusted or set to give a greater or less output from the generator and produce greater or less drag or resistance to the rotation of the armature thereof.

The gears 10 mesh with a large gear 20 preferably located for convenience at the opposite side of the center of the differential gearing from the gear 12. As shown in the drawings, the gear 20, which is fastened to the driven shaft 2 by means of a key 21, has a radius much greater than the radius of the gear 12. This produces an unbalanced differential gear, or, in other words, a gear having arms or sides of different radii and leverage. For example, the gear 20 may have a radius of six inches, while the gear 12 has a radius of one and one-half inches. The radius of the gear 10 may be one inch and the radius of the gear 11 approximately one and one-half inches. This would produce, so far as torque is concerned, an unbalanced differential gear of approximately six to one ratio. In Figure 5, however, I have disclosed how the above ratio may be still further increased, resulting in a still further torque reduction ratio. Thus as an alternative, instead of a simple spider 5 I provide a spider 5' having a disc gear extension 40 arranged to mesh with a pinion gear 43 to correspond with a pinion gear 10' on a shaft 7' mounted rotatably on the said spider structure 5'. On the lower end of the shaft 7' is a beveled gear 11' meshing with a beveled gear 12'' integral with a spider frame 41 which carries a shaft 42 for the pinion gear 43 above referred to. Since the shaft 42 likewise carries a beveled gear 44 meshing with the dynamo bevel gear 12', it follows that the resulting reaction torque on the armature 15 to balance with the torque on the shaft 2 can be made very small. As a consequence of the above it will be found that the size of the dynamo unit 15 with respect to the motor unit 22 can be very considerably reduced, which is of importance in a differential gearing system where limited space and weight are available. A further multiplicity of spiders acting in like manner will further reduce the reaction torque of the armature to any desired degree.

Mounted fast on the driven shaft 2 is the armature 22 of an electric motor which revolves within the field frame 23, said motor being energized by the current developed by and transmitted from the generator above described.

The mechanism above described is mounted within a suitable housing or casing, the latter being shown as embodying two end sections 24 and 25 and an intermediate section 26. The complete casing or housing also embodies the opposite end walls 27 and 28 and intermediate partitions or webs 29 and 30. The shafts 1 and 2 are arranged in one embodiment described end to end in longitudinal alinement, one of said shafts being formed with a socket 31 or the like and the other shaft being formed with a tenon 32 fitting the socket 31, thus permitting relative rotative movement of the two shafts while maintaining their longitudinal alinement.

At one end of the casing or housing, above referred to, I provide an extension housing 33 containing suitable reversing gearing. As shown in Figures 1 and 10, the reversing gearing embodies a counter-shaft 34 parallel to the driven shaft 2 and connected therewith by means of gears 35 and 36 which cause the shaft 34 to rotate in a reverse direction from the shaft 2. The shaft 2 also carries a sliding gear 37 feathered thereto and said gear 37 is adapted to mesh with an idle or reversing gear 38 (see Figure 3), the latter in turn meshing with a gear 39 fast on the countershaft 34. Thus by shifting the gear 37, reverse rotation may be imparted to the shaft 2, as compared with the direction of rotation of the driving shaft 1.

The manner of arranging the windings on the field frames 16 and 23 (Figures 1 and 5) is in one embodiment schematically indicated in Figure 9. It will be explained below, however, how other and alternative forms can be carried out. In the particular method illustrated in Figure 9, both generator and motor have shunt field windings respectively 115 and 122, and series windings 150 and 220. Whereas the generator series winding 150 is arranged in the above embodiment to oppose the corresponding shunt winding 115, in the case of the motor the series winding 220 is arranged to add its magnetizing effect to the corresponding shunt winding 122.

Turning now to Figure 10, a construction alternative to that shown in Figures 1 and 5 is indicated, with the differential drive, however, reduced to simplest terms in order to emphasize the details of an alternative automatic electrical system functioning substantially the same as that corresponding to Figure 9. The element of difference between Figures 1 and 10 resides principally in the two field exciters furnished for the motor and generator respectively, since it will be understood that the torque reduction gearing of Figures 1 and 5 can be incorporated in Figure 10 quite simply. In the present instance the additional showing would merely serve to complicate the drawing needlessly. Thus it will be seen that the armature 40, of the exciter coupled to the generator, is connected so as to furnish current to the motor field 222; whereas the armature 41, of the exciter coupled to the motor, is connected to furnish current to the generator field 215. The respective fields 140 and 141 of the two exciters are preferably arranged to be fed from a common battery source or the like 42, though it will be understood that I also contemplate varying the relative excitation of the two exciters as an alternative (see Figure 16) to those cases described below in which the field windings of the motor and generator circuits are varied either manually or automatically as a function of the speed in order to produce the proper voltage reaction across the terminals of the motor and generator units.

As a consequence it is seen that by means of the above circuits that as the motor shaft slows up the field excitation to the generator will tend to diminish, whereas the field excitation of the motor will corespondingly increase, since the generator shaft necessarily experiences an increased speed at the expense of the speed of the motor shaft. Furthermore, it should be pointed out that in the interest of clearness a friction clutch 45 may be used when synchronous speeds are attained, as illustrated only in Figure 10, whereas it is obvious that the same can also be incorporated in Figures 1 and 5 to perform precisely the same type of function.

In all cases where electrical units are employed having common feeders, it should be pointed out that it is not only necessary to satisfy the conditions of torque, but also the voltage relation of the respective units with respect to the voltage of the common feeders. In Figure 7, therefore, which latter can be made to apply to the single stage mechanical gearing of Figure 1 as well as to the dual stage gearing in Figure 5 and even to the showing of Figure 10, with increase in torque on the load shaft 2, the motor always tends to slow up so that for the same excitation 222 a lower voltage across the motor terminals must be looked for. At the same time the generator also tends to speed up so that from the point of view of voltage across the feeders electrically joining the armatures 22 and 15 together, it is necessary so to arrange matters that as the generator speeds up the excitation of the field winding 222 of the motor shall correspondingly increase in proportion, whereas with the motor 22 diminishing in speed the excitation 215 of the generator shall necessarily diminish. This condition will then tend to produce a balance and as a result the armature current will then automatically adjust itself according to the respective loads placed on the generator 15 and motor 22. To attain the necessary voltage balance I propose, therefore, in one embodiment to have the exciter armatures of the units 15, 40 and 22, 41 coupled in some sort of way so that by means of an external battery 42 or the like the excitations 140 and 141 shall be substantially constant or at least proportionate to each other, making the whole system automatic and free from required attention of the operator or the like, so far as the manipulation of field excitation is concerned.

Systems of excitation not quite so automatic in character as the last can be employed. Thus as against the arrangement illustrated in Figure 9, that indicated in Figures 11 and 12 can be employed, permitting the use of saturated magnetic systems. Thus, in Figures 8 and 14 I have provided independent manual controls for resistance units 44 whose individual steps are properly coordinated to attain the desired result with respect to the electrical instrumentalities illustrated in Figure 10 on the one hand, or Figures 1 and 5 on the other.

As an alternative to manual control of the field rheostats, according to the system Figure 9, I have diagrammatically illustrated in Figure 12 a method whereby a common resistance lever arm 45 can be employed to effect an automatic resistance control in both the motor and generator field circuits to be governed in its setting by means of a link 46 controlled by a centrifugal governor 47 mounted on the motor shaft (see Figures 10 and 12). Correspondingly, in Figure 14 the link 46 is connected to the rheostat arm 45 which governs the relative excitation currents of the generator and motor arrangements with the exciters mounted according to Figure 10.

The operation of the transmission mechanism may be described as follows:

Motion being imparted to the shaft 1 by the prime mover 3, said shaft 1 drives the spider 5 at the same speed. As the spider 5 rotates, the gears 10 mesh with the large gear 20, see Figure 1, while the gears 11 mesh with the gear 12. In starting the transmission gearing, the large gear 20 tends to hold back and not rotate. Therefore, the pinions 10 roll around the teeth of the gear 20, imparting rotary motion to the shafts 7. This produces a driving effect on the gear 12 and rapidly rotates the armature 15 of the generator. A resistance or drag is now set up against the rotation of the armature 15 by the field 16, causing a current of electricity to be generated, which is conducted, if desired, to the electric motor on the opposite side of the differential gear, thereby causing a rotative movement of the driven shaft 2. The reaction of the armature 15 now operates through the gears 12, 11 and 10, or the larger gear 20, and thus to the driven shaft 2, the latter being therefore driven mechanically as well as magnetically. The greater the resistance to the rotation of the armature 15, the greater the speed at which the driven shaft 2 is rotated. Furthermore, as the load on the driven shaft 2 or the work performed thereby increases or decreases, the speed of said driven shaft 2 correspondingly increases or decreases and therefore if the prime mover 3 is rotating at a constant speed and developing a constant amount of energy, the power or energy transmitted to the shaft 2 can also be made to be uniform irrespective of the R. P. M. of the shaft 2.

In the case of Figure 5 the effect is substantially the same as in Figure 1 except for the fact that the torque required on the armature 15 is considerably less than that required for a single step reduction as in Figure 1 or even that shown in Figure 10 where no reduction appears. Indeed, it should be pointed out that even under those circumstances in which the armature 15 performs its maximum of work electrically, the fact that with non-synchronous rotation the armature 15 tends to rotate at high speed it will mean that a considerable reduction in the voluminal dimensions (the so-called $D^2L$ of the electrical designer) will be obtained enabling a much smaller casing 24, 27, 29, to be employed.

In connection with aeroplane work or the like it is rather important, as stated above, to obtain a system of automatic control that leaves the aviator free to perform other duties calling for his attention. In order to attain this object, and in conjunction with the unbalanced differential system above described, at least two entirely automatic systems are disclosed herewith effecting this one object.

Thus with the minimum number of electrical units as illustrated in Figures 1 and 5, the electrical diagrams (Figures 9, 11, 12 and 15) apply. In the above additive compound windings are provided for the motor frame, whereas differential compound windings are provided for the generator unit. According to this system, therefore, as the load on the motor shaft increases, the ampere turns available for the motor become greater as the series current becomes greater because of the load, whereas the opposite is true for the generator since the latter naturally increases in speed as the load on the motor increases.

In the case of Figure 9 the necessary variations in the field currents are electromagnetically arranged to be automatically self regulating, whereas in Figure 11 an added manual control of the rheostat arm 45 is presumed, permitting in consequence a greater latitude in design. It is clear that the regulation can be made to depend upon a centrifugal governor control such as illustrated in Figures 10 and 13. An arrangement of this character is illustrated in Figure 15 comprising the link 46.

As an alternative to the above, depending on the speed of the load shaft, both motor and generator shunt windings can be made automatically regulatable by a mechanical speed control. It should be emphasized, however, that the individual steps in the rheostats 44 (see Figure 12 for example) are so made up that the speed load characteristics are satisfied as a function of the movement of the link 46.

Turning now to the operation of the dual exciter system illustrated more particularly in Figure 10, we have the exciter current of the generator dependent on the increase or decrease of speed of the motor unit relative thereto. Similarly, the exciter current of the motor unit is made dependent directly on the axial speed of the generator unit. As a consequence it is a very simple matter to satisfy the voltage conditions obtaining in the circuit of the armatures 15 and 22. However, in order to obtain greater latitude in design I have illustrated semi-automatic controls such as that indicated in Figure 14, where rheostats are employed actuated in their setting by the speed condition of the motor shaft 2.

While the transmission gearing herein shown and described is capable of many applications, and is useful for many purposes such as automobile drive, machine tool headers, land and marine turrets, submarines, etc., it may be well to set forth one application of the transmission gearing. In the operation of aircraft, it is well known that the higher the altitude attained by the aircraft, for a given number of revolutions of the propeller, the less traction or grip the propeller has on the air by reason of the rarification of the air at higher altitudes, and therefore the speed of the aircraft through the air correspondingly decreases. With the present day power equipment used in connection with aircraft it is impracticable to carry or raise the R. P. M. of the engine above its maximum efficiency, which may be, for example, 1600 R. P. M., for the reason that if the R. P. M. is raised above such point, there is a very rapid drop in the power curve of the engine. In other words, the engine rapidly loses its efficiency above the critical R. P. M. If the propeller is designed to give the maximum efficiency at a low altitude it loses a degree of its efficiency at the same speed at high altitudes. In order to maintain the efficiency of the propeller at higher altitudes it is necessary to increase the R. P. M. thereof.

Under the present invention, as a higher altitude is obtained, the R. P. M. of the propeller will be automatically increased by reason of the action of the differential means hereinabove described in its relation to the prime mover and the driven shaft which ordinarily carries the propeller in aircraft, and the relation of said parts to the electric generator and motor which function as above described. Supposing now the engine or prime mover be revolving at its maximum R. P. M., which may be 1600, and developing its maximum power, as the aircraft reaches higher and higher altitudes, for the same number of revolutions of the prime mover the speed of the propeller increases so that the efficiency of the propeller is maintained, enabling the aircraft to be driven at the same speed, irrespective of the altitude of the aircraft.

What is claimed is:

1. A mechanism comprising a differential gearing, interconnected electromagnetic units coupled to the respective sides of said gearing, exciters mechanically coupled to said electromagnetic units, the power circuits of said exciters being cross-connected to said units.

2. A differential gearing means comprising electromagnetic action and reaction means, and automatic means for diminishing the voltage of the reaction means as said latter means speeds up, and further means for increasing the voltage of the action means as said last named means diminishes in speed.

3. A transmission means comprising a mechanical drive means and an electrical drive means functioning in parallel, said electrical drive means being operated at the expense of said mechanical drive means for varying speeds at which power is delivered, and means automatically depending upon the speed with which power is delivered for regulating the electrical drive means at the expense of the speed of the mechanical drive means, and further means for setting a maximum speed at which power is delivered from the transmission means.

In testimony whereof I affix my signature.

CHALMERS G. HALL.